United States Patent
Küppers et al.

(10) Patent No.: US 11,047,838 B2
(45) Date of Patent: Jun. 29, 2021

(54) METHOD FOR ELEMENTAL ANALYSIS

(71) Applicant: C. Gerhardt GmbH & Co. KG, Konigswinter (DE)

(72) Inventors: Werner Küppers, Konigswinter (DE); Jan Macke, Konigswinter (DE)

(73) Assignee: C. Gerhardt GmbH & Co. KG

( * ) Notice: Subject to any disclaimer, the term of this patent is extended or adjusted under 35 U.S.C. 154(b) by 236 days.

(21) Appl. No.: 16/070,539

(22) PCT Filed: Jan. 18, 2017

(86) PCT No.: PCT/EP2017/000056
§ 371 (c)(1),
(2) Date: Jul. 17, 2018

(87) PCT Pub. No.: WO2017/125246
PCT Pub. Date: Jul. 27, 2017

(65) Prior Publication Data
US 2019/0025266 A1   Jan. 24, 2019

(30) Foreign Application Priority Data
Jan. 18, 2016 (EP) .................................... 16000112

(51) Int. Cl.
| | |
|---|---|
| *G01N 31/12* | (2006.01) |
| *B01J 23/889* | (2006.01) |
| *B01J 21/04* | (2006.01) |
| *B01J 35/02* | (2006.01) |
| *B01J 35/08* | (2006.01) |
| *B01J 35/04* | (2006.01) |
| *B01J 23/00* | (2006.01) |

(52) U.S. Cl.
CPC .............. *G01N 31/12* (2013.01); *B01J 21/04* (2013.01); *B01J 23/002* (2013.01);
(Continued)

(58) Field of Classification Search
CPC ....... G01N 31/12; B01J 35/023; B01J 23/002; B01J 21/04; B01J 35/04; B01J 23/8892;
(Continued)

(56) References Cited

U.S. PATENT DOCUMENTS

| | | |
|---|---|---|
| 3,972,682 A | 8/1976 | Stephens et al. |
| 2004/0151647 A1 | 8/2004 | Wanninger et al. |

(Continued)

FOREIGN PATENT DOCUMENTS

| | | |
|---|---|---|
| DE | 4436205 C1 | 1/1996 |
| DE | 10252103 A1 | 5/2004 |
| EP | 0225595 A2 | 6/1987 |

(Continued)

OTHER PUBLICATIONS

Taplin, Harry R., Jr.. (1991). Combustion Efficiency Tables. Fairmont Press, Inc.. Retrieved from https://app.knovel.com/hotlink/toc/id:kpCET0000C/combustion-efficiency/combustion-efficiency (Year: 1991).*

(Continued)

*Primary Examiner* — Lyle Alexander
*Assistant Examiner* — Jean Caraballo-Leon
(74) *Attorney, Agent, or Firm* — The Webb Law Firm

(57) ABSTRACT

The invention relates to a method for elemental analysis, in particular for determining carbon and nitrogen in a sample, an apparatus suitable for said method, and the use of a catalyst suitable for said method, the catalyst being a metal oxide catalyst comprising oxides of Ce, Cu and Mn.

15 Claims, 1 Drawing Sheet

(52) U.S. Cl.
CPC ......... *B01J 23/8892* (2013.01); *B01J 35/023* (2013.01); *B01J 35/026* (2013.01); *B01J 35/04* (2013.01); *B01J 35/08* (2013.01); *B01D 2255/2065* (2013.01); *B01D 2255/2073* (2013.01); *B01D 2255/20761* (2013.01); *B01J 2523/00* (2013.01)

(58) Field of Classification Search
CPC ...... B01J 35/026; B01J 35/08; B01J 2523/00; B01D 2255/2073; B01D 2255/2065; B01D 2255/20761
See application file for complete search history.

(56) References Cited

U.S. PATENT DOCUMENTS

2010/0266473 A1   10/2010  Chen et al.
2013/0072715 A1*   3/2013  Norman ................ B01J 37/031
562/599

FOREIGN PATENT DOCUMENTS

| JP | 63185452 A | 8/1988 |
|---|---|---|
| JP | 2014085215 A | 5/2014 |

OTHER PUBLICATIONS

Dumatherm, "Ellemental Analyser for Carbon and Nitrogen", Gerhardt Analytical Systems, 2008, 1-3 pages.
Kuppers et al., "Sind Makro-Einwaagen bei Makro-Kosten noch zeitgemab?", Gerhardt Analytical Systems, 2015.
Martin et al., "Gas-Phase Chromatography", Nature, 1955, pp. 422-423, vol. 175. (Abstract only).

* cited by examiner

METHOD FOR ELEMENTAL ANALYSIS

CROSS-REFERENCE TO RELATED APPLICATIONS

This application is the United States national phase of PCT International Application No. PCT/EP2017/000056 filed Jan. 18, 2017, and claims priority to European Patent Application No. 16000112.9 filed Jan. 18, 2016, the disclosures of each of which are hereby incorporated by reference in their entireties.

BACKGROUND OF THE INVENTION

Field of the Invention

The present invention relates to a method for elemental analysis, in particular for determining carbon and nitrogen in a sample, as well as an apparatus suitable for said method and the use of a catalyst/catalyst mixture suitable for said method.

Related Art

Elemental analyses, in particular the determination of carbon and nitrogen in a sample, have become a necessary part of production processes for many reasons. For example, due to waste disposal regulations for many types of waste, the (organic) carbon content must be determined, which is then decisive for classification in the respective landfill classes. Nitrogen contents are relevant factors for determining the water quality of waste, service and river water, for example. It is also important to determine the carbon and nitrogen content of soil samples, or samples of plant origin.

Well-established methods exist for such investigations, which are essentially based on the oxidation/mineralization of (dry) samples in high excess oxygen at high temperatures. The relevant elements, in particular carbon and nitrogen, are completely converted into (gaseous) oxides, which can then be detected or quantified using known techniques. However, one problem with such elemental analyses is the fact that, for example, the carbon present in a sample does not completely oxidize to $CO_2$ even at high temperatures and high oxygen surplus, but remains a problematic proportion of carbon monoxide for the subsequent quantification. Therefore, the gas mixture obtained after the first oxidation is usually subjected to a post-treatment (also in a large oxygen surplus) in order to convert carbon monoxide still present safely, completely and reproducibly to carbon dioxide. Usually, chromium-based catalysts are used. Another problem that partly occurs is the lack of assurance of a well reproducible oxidation reaction, since a quantitative as well as qualitative analysis is only possible in the presence of reproducible processes.

An additional problem in elemental analysis concerns the presence of volatile organic compounds, which must also be subjected to catalytic post-oxidation to provide a complete result in carbon analysis. Chromium-based catalysts are also substantially used for this purpose in the state of the art.

SUMMARY OF THE INVENTION

However, it would be desirable not to use chromium-based catalysts, as these materials pose considerable health and environmental risks. At the same time, however, the reliability of the catalytic post-treatment (oxidation to $CO_2$ of existing not completely oxidized carbon fractions to $CO_2$) must not be impaired. In addition, methods should at least to some extent be tolerant of problematic ingredients, such as halogens and saline components in particular. The method should also allow a high number of samples to be processed without any loss of quality. It is therefore the object of the present invention to provide a corresponding method for elemental analysis, in particular for the determination of nitrogen and carbon.

BRIEF DESCRIPTION OF THE INVENTION

The object is solved by a method according to claim 1, by the use according to claim 8 and the apparatus according to claim 11. Preferred embodiments of the invention are defined in the dependent claims and in the following description.

In some examples, the present invention provides a method for elemental analysis, in particular for the determination of carbon and nitrogen, comprising feeding a sample to a first part of a combustion unit at temperatures of at least 500° C. and an atmosphere with a high oxygen content, passing the resulting gas over a metal oxide catalyst in a second part of the combustion unit wherein the metal oxide catalyst comprises oxides of Ce, Cu and Mn, separation of $CO_2$ and $H_2O$ by known gas drying systems or absorption systems, reduction of the nitrogen oxides obtained and measurement of the nitrogen obtained using a suitable detector, and measuring the amount of carbon in the sample by determining the $CO_2$ content.

In some examples, the present invention provides a method for elemental analysis for determination of the amount of carbon and nitrogen in a sample, comprising: (a) feeding the sample to a first part of a combustion unit at a temperature of at least 500° C. and an atmosphere with a high oxygen content, (b) passing resultant gas from step (a) over a metal oxide catalyst in a second part of the combustion unit, wherein the metal oxide catalyst comprises oxides of Ce, Cu and Mn, (c) reducing nitrogen oxides obtained from step (b) to nitrogen, (d) measuring the amount of nitrogen in the sample obtained from step (c), (e) separating $H_2O$ and $CO_2$ from the sample obtained from step (c), and (f) measuring the amount of carbon in the sample by determining the $CO_2$ content.

In some examples, the present invention provides a metal oxide catalyst comprising oxides of Ce, Cu and Mn for the oxidation of all sample components in an elemental analysis process, in particular for the autoxidation of carbon monoxide and volatile organic compounds (VOC) to carbon dioxide.

In some examples, the present invention provides an apparatus for elemental analysis, in particular for determining carbon, comprising a combustion unit containing at least partially a catalyst, wherein the catalyst is a metal oxide catalyst comprising oxides of Ce, Cu and Mn.

BRIEF DESCRIPTION OF THE DRAWINGS

The foregoing summary, as well as the detailed description, will be better understood when read in conjunction with the appended drawings. The present invention is described herein in greater detail using associated drawings. In the drawings.

DETAILED DESCRIPTION

Figure 1:
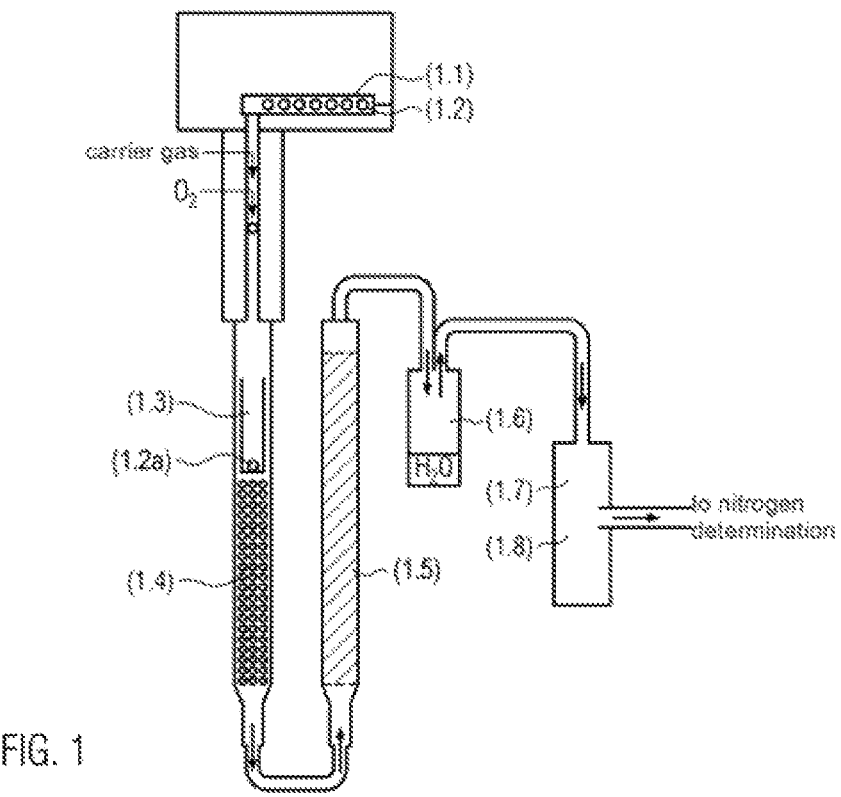
FIG. 1 is a schematic representation of an apparatus structure for carrying out the analysis according to the present invention.

The method of the present invention is characterized in that a chromium-free mixed oxide catalyst comprising Ce, Mn and Cu is used as a catalyst for oxidation after volatilization at high temperature in the oxygen stream. Such processes work with inert carrier gases, in particular argon and/or helium, in which case an oxygen stream is added for oxidation. The use of pure oxygen is preferred, although mixtures with inert gases are theoretically also conceivable. Due to the catalyst used in accordance with the present invention, an overdose of oxygen is not necessary. Taking into account the sample weight and, if necessary, the sample type, a sufficient amount of oxygen can be calculated and a corresponding oxygen flow can be set so that the consumption of necessarily high-purity gases is also minimized in this connection. It has unexpectedly been shown that such a catalyst is well suited to ensure that the desired full oxidation occurs during post-treatment. The use of helium as carrier gas in combination with the detection methods described below also enables an accurate determination of very low nitrogen contents.

This allows the use of chromium-based catalysts and post-combustion tubes to be dispensed with without compromising the accuracy and reproducibility of the measurement, while maintaining the usual process sequences. The method according to the invention is particularly suitable for the determination of carbon (inorganic and organic origin) and nitrogen and shows no problems in the determination of samples containing high amounts of volatile organic components (VOC). In doing so, it is advantageous to fall back on the already existing, fundamental processes known to the expert, so that the present invention can be easily implemented in already existing systems. For example, the samples to be inspected can be encapsulated in a suitable and known manner in order to introduce the sample into a combustion chamber without further contamination, e.g. via an autosampler (the term combustion chamber refers here to the part of a device in which the sample is subjected to the first high-temperature treatment in slight excess oxygen). If the sample to be inspected is already liquid and evaporates quantitatively during injection/insertion into the high temperature range, the sample input and the oxygen dosage can of course be modified accordingly. In any case, the gaseous components are then oxidized in excess oxygen in the presence of the chromium-free catalyst defined here in order to obtain a gas mixture suitable for qualitative and quantitative analysis.

The catalyst used in this invention comprises a mixture of oxides of the metals Cu, Mn and Ce, is preferably free of precious metals and contains in particular no Ag. The catalyst also contains no Ti or Zr and no toxic Cr or Ni. Such catalysts are known from the field of exhaust gas treatment and can be obtained, for example, from the company Inter-kat. Advantageously, the proportions of the metal components (Co+Mn+Ce=100 atomic %) are selected such that each component is present in an amount of at least 5 atomic %. It has been shown that the amounts of copper and manganese are typically larger than the amount of Ce, whereby the proportion of Cu is advantageously higher than the proportion of Mn. The catalyst to be used can either be a mixture of the metal oxides described here or as a supported catalyst, i.e. the metal oxide components are finely distributed on inert carrier materials for the desired analysis. Ceramic materials such as $Al_2O_3$ are particularly suitable substrates, and the production of such catalysts is known to experts, for example through washcoat processes. Such supported catalysts can be in the form of small beads or pellets, for example, so that simple handling is ensured. The use of supported catalysts (i.e. catalysts applied to materials with a large surface area, such as porous materials) makes it easy to increase the active surface area of the catalyst so that supported catalysts are more effective in many applications.

If, for example, catalysts supported on $Al_2O_3$ are used, these are preferably in the form of small pellets or balls, with diameters of 1 to 6 mm, preferably 1 to 4 mm. Such sizes ensure easy handling and provide suitable properties for the operation of an elemental analysis system; in particular, the gas flow is not disturbed by a bed of such supported catalysts, allowing easy elemental analysis.

In this context it is surprising that the catalysts to be used according to the invention allow such a reproducible and complete oxidation, so that an application for the quantitative elemental analysis of different sample matrices becomes usable. Even the smallest variations in oxidation would lead to measurement results that are no longer usable for the required accuracy in elemental analysis. It is therefore surprising that such catalysts, developed for more commercial applications, can replace the "gold standard" chromium catalyst without compromising the accuracy of the measurements. Thus, this invention enables the problem-free and exact determination of nitrogen and carbon content in samples with the required accuracy. In comparison with conventional catalysts, it has been shown that the number of measurable samples can also be increased by using the catalyst to be used in accordance with the invention, without the need for regeneration or even replacement of the catalyst. Thus, not only several hundred samples but significantly more than 800 samples can be measured in standard operation with the catalyst to be used according to the invention, whereby sample numbers of more than 1000 (e.g. up to 1200) without loss of quality (and without regeneration or even catalyst replacement being necessary) have proven to be possible.

As already explained, the inventive apparatus for elemental analysis can make use of existing technologies. Such a device, based for example on the DUMATHERM devices of the applicant, preferably comprises, to ensure an automatic analysis sequence, an automatic sampler which automatically introduces the sample to be analysed into the area in which the evaporation and oxidation takes place. This autosampler can be an injection system (for liquid samples) or a system with a gripper arm and suitable locks for processing solid samples that have been encapsulated in a suitable form (e.g. in tin foils or etc.). The excess oxygen necessary for oxidation can be achieved by introducing suitable gases, whereby mixtures of inert gases (which must not impair the analysis, e.g. argon or helium) with oxygen or pure oxygen are suitable. The apparatus also comprises a "combustion chamber" for treating the samples at high temperature in the oxygen stream and, separately or directly combined therewith, a region in which the gaseous sample components are oxidized, possibly after first oxidation in excess oxygen in the presence of the catalyst to be used in accordance with the invention. This area can be, for example, a glass tube filled with the catalyst.

Then the completely oxidized gas mixture is fed to the further process steps known to the person skilled in the art in order to carry out the desired quantitative analysis. The suitable fixture components and process parameters are known to the person skilled in the art.

The temperature for oxidation treatment as described above, for example, ranges from 600 to 1050° C., preferably 850 to 950° C., as complete oxidation is ensured in this temperature range without any adverse effects for the catalyst.

The temperature in the combustion chamber, i.e. the part of the apparatus in which the samples are first evaporated/mineralized/oxidized, may be higher if desired, as long as no negative effect is exerted on the catalyst to be used. Temperatures in excess of 1000° C. are possible in this range to ensure the fastest and most complete transfer of all components to the gaseous state possible.

The composition of the catalysts to be used according to the invention can be varied depending on the samples to be determined in order to avoid problems that may arise due to the presence of interfering components (e.g. halogens). However, by using the catalysts described above, such interfering influences can be minimized to such an extent that adverse effects on the analysis are avoided. If necessary, the service life of the catalysts is reduced if many samples with interfering components are analyzed.

The catalyst to be used in accordance with the invention is a mixed oxide catalyst free of precious metals on a support of aluminium oxide $Al_2O_3$. The catalyst has a composition of 13 to 16% by weight Ce, 8 to 10% by weight Mn and 3 to 5% by weight Cu. The quantity missing at 100% by weight is the carrier.

A catalyst with this composition shows a particularly high activity, especially in a high temperature range >800° C. and/or in oxygen-containing gas mixtures in combustion analysis.

The determination of the nitrogen content of the sample can be performed in accordance with known processes, for example by means of a thermal conductivity detector. The necessary device details and procedures are known to the expert. In one stage of the process, for example, the nitrogen content is reduced using a suitable additional catalyst, such as pure copper (in a suitable form known to the expert), so that quantification is made possible (Dumas process).

The $CO_2$ can be measured e.g. with an IR detector, coulometric detectors are also possible. The detection of organic material by combustion and subsequent $CO_2$ measurement in the IR detector is known in principle, e.g. DE4436205 and Martin et al. (Nature 175 (1955), 422f). The process used here also allows the desorption and measurement of the $CO_2$ produced during combustion using the thermal conductivity detector already used for nitrogen measurement. For this purpose, the $CO_2$, which is initially adsorbed completely on a zeolite surface, is desorbed again by adding heat and the nitrogen is measured in the same thermal conductivity detector. Usually, the water portion is separated beforehand by suitable processes. This means that samples containing moisture or water in particular can be analyzed without any problems (with the additional option of determining this water content separately, if necessary). The separation of the water content also ensures the service life of an analysis device. The detector is calibrated in advance with suitable reference substances of known nitrogen and carbon content. If the amount of carbon is also determined using the thermal conductivity detector described above, the entire analysis procedure and the corresponding apparatus can be simplified with regard to necessary detectors, since the two essential components (carbon and nitrogen) can be determined with the same detector. This simplifies both process control and the device itself.

An elemental analyzer of the applicant can be used as the instrument basis for carrying out the method according to the invention, so that reference is made to this analyzer (e.g. DUMATHERM apparatuses of the applicant) with regard to apparatus details which are not listed in detail in the following description.

FIG. 1 schematically shows the analysis procedure and a suitable apparatus structure. An automatic sampler (1.1) contains several samples (1.2) which are brought into the combustion/oxidation area in a controlled manner. For example, a sample (1.2a) initially falls into a high temperature range (1.3). Subsequently, the autoxidation according to the invention is carried out in an area with the catalyst according to the invention (1.4). The gaseous mixture is then first passed through a reduction area (1.5) in which nitrogen oxides are reduced to nitrogen (for example over pure copper). Then water is separated (1.6) and the $CO_2$ fraction (1.7 and 1.8) is separated and determined. Not shown is the range in which the nitrogen content is determined, but which can be arranged in a manner familiar to the person skilled in the art.

Figure 2:
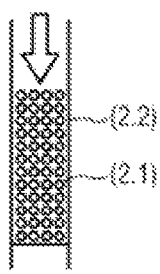
FIG. 2 shows the apparatus structure of FIG. 1 for carrying out the combustion/oxidation step.

The core of the apparatus is a combustion/oxidation arrangement as schematically shown in FIG. 2 (the schematic overall sequence is sketched in FIG. 1, see above).

The shown combustion unit first comprises the area into which the samples to be measured are introduced. Here the sample is transferred to the gaseous state, whereby oxidation can already take place to a large extent. In the case of liquid samples, the temperature in this area of the device is sufficient for this evaporation; in the case of solid samples, the transfer to the gaseous state is effected by the combined effect of the high temperature prevailing here with the (high) excess oxygen present. Then, catalyzed by the chromium-free catalyst described here, the complete oxidation of the gaseous components necessary for the measurement takes place.

The sample, either in a capsule or in a suitable crucible/sample container, is automatically introduced into the first part of the combustion unit by means of a gripper arm not shown in detail (if necessary in combination with an automatic injection system). Alternatively, the sample can be packed in foil and placed in an xy-controlled, pneumatic sampler. A gripping mechanism is not necessary. Suitable films for packaging the sample are in particular metal foils, preferably tin foils or nitrogen-free paper. Such foils do not disturb the intended analysis or their influence on the analysis result can be corrected mathematically. The necessary oxygen-rich gas mixture is supplied in a suitable manner. This ensures that the respective gas mixture is applied to the sample before it is introduced into the combustion unit. The temperature is adjustable to ensure rapid evaporation/oxidation on the one hand, and not to impair the catalyst on the other.

FIG. 2 shows a detailed view of the area of the device containing the catalyst. This can be arranged in different ways in the device; it is important to provide a large contact surface with the gas mixture. As already described above, such a large contact surface can be ensured, for example, by the presence of supported catalysts. In FIG. 2 the arrow indicates the direction of gas flow, the reference numeral (2.1) denotes the catalysts, which is shown here in the form of a sphere made of $Al_2O_3$ support with mixed oxide catalysts applied. The reference numeral (2.2.) denotes the glass tube in which the catalytic converter is arranged.

The method according to the invention can be used to examine all types of samples. Both solid and liquid samples can be measured by suitable design of the sampler. At the same time, the inventive process is tolerant to elements that may be problematic in traditional measurements, such as halogens or generally saline matrices.

The use of a catalyst based on a mixture of at least three metal components (Cu, Mn, Ce, preferably with a decreasing mass fraction in this order) ensures good oxidation. The metal components are present in the catalyst in the form of their oxides. The mixing ratios of the components make it possible to obtain catalysts that are specifically suitable for certain sample types. The three essential metal components are stable in the catalyst due to the conditions prevailing in the process (relatively high temperatures and high oxygen content), any defects that may occur (such as local reduction) are automatically regenerated during operation under the conditions prevailing in the process, without the need for a separate regeneration treatment.

The catalyst used in this invention is chromium-free. In addition to the essential components, additional metal components may be included if this results in advantages. Preferred, however, is the catalyst, which contains no other metal components (as metal or in the form of an oxide) apart from the oxides of Mn, Cu and Ce.

Measurement Results

Different samples, reference substances and pure substances were measured with the described setup and the procedure described above. The results were exact and showed no relevant variability. Up to 1200 samples without quality loss could be determined with one catalyst charge.

Thus, the described procedure with the appropriate apparatus and the described use provides a solution to the problem of the use of chromium in analytical equipment, while maintaining the required accuracy and reproducibility of the analysis.

The invention claimed is:

1. A method for elemental analysis for determination of the amount of carbon and nitrogen in a sample, comprising:
   (a) feeding the sample to a first part of a combustion unit at a temperature of at least 850° C. and an atmosphere with a high oxygen content,
   (b) passing resultant gas from step (a) over a metal oxide catalyst in a second part of the combustion unit, wherein the metal oxide catalyst comprises oxides of Ce, Cu and Mn, wherein the amount of Ce, Mn and Cu in the metal oxide catalyst satisfies the mass ratio Ce<Mn<Cu,
   (c) reducing nitrogen oxides obtained from step (b) to nitrogen,
   (d) measuring the amount of nitrogen in the sample obtained from step (c),
   (e) separating $H_2O$ and $CO_2$ from the sample obtained from step (c), and
   (f) measuring the amount of carbon in the sample by determining the $CO_2$ content.

2. The method according to claim 1, wherein the sample is introduced into the combustion unit via an automatic sampler.

3. The method according to claim 1, wherein the metal oxide catalyst is a supported catalyst.

4. The method according to claim 3, wherein the supported catalyst is in the form of granules, in spherical form or in monolithic form.

5. The method according to claim 1, wherein the atmosphere with a high oxygen content is pure oxygen.

6. The method according to claim 1, in which a noble gas is used as the carrier gas.

7. The method of claim 1, wherein the reduction of nitrogen oxides obtained from step (b) is over a surface of pure copper.

8. The method of claim 1, wherein measuring the amount of nitrogen obtained from step (c) is performed by means of a calibrated thermal conductivity detector.

9. The method of claim 1, wherein measuring the amount of carbon in the sample is performed by quantitative desorption of $CO_2$ adsorbed in the analytical process and subsequent detection.

10. The method of claim 9, wherein the subsequent detection is performed by means of a calibrated thermal conductivity detector.

11. The method of claim 3, wherein the metal oxide catalyst is present on an alumina support.

12. The method of claim 4, wherein the supported catalyst is in spherical form.

13. The method of claim 12, wherein the supported catalyst in spherical form has a diameter of 1 to 6 mm.

14. The method of claim 13, wherein the supported catalyst in spherical form has a diameter of 2 to 4 mm.

15. The method of claim 6, wherein the noble gas is helium or argon.

* * * * *

UNITED STATES PATENT AND TRADEMARK OFFICE
CERTIFICATE OF CORRECTION

PATENT NO.         : 11,047,838 B2                                          Page 1 of 1
APPLICATION NO.    : 16/070539
DATED              : June 29, 2021
INVENTOR(S)        : Werner Küppers et al.

It is certified that error appears in the above-identified patent and that said Letters Patent is hereby corrected as shown below:

On the Title Page

Item (73), Column 1, Assignee, Line 1, after "KG" insert -- (DE) --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*